(12) United States Patent
Basu Mallick et al.

(10) Patent No.: US 12,101,800 B2
(45) Date of Patent: Sep. 24, 2024

(54) RESOURCE POOL ASSIGNMENT

(71) Applicant: LENOVO (BEIJING) LIMITED, Beijing (CN)

(72) Inventors: Prateek Basu Mallick, Dreieich (DE); Xiaodong Yu, Beijing (CN); Lianhai Wu, Beijing (CN); Joachim Lohr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 554 days.

(21) Appl. No.: 17/280,093

(22) PCT Filed: Nov. 2, 2018

(86) PCT No.: PCT/CN2018/113730
§ 371 (c)(1),
(2) Date: Mar. 25, 2021

(87) PCT Pub. No.: WO2020/087512
PCT Pub. Date: May 7, 2020

(65) Prior Publication Data
US 2022/0007378 A1    Jan. 6, 2022

(51) Int. Cl.
*H04W 72/56*   (2023.01)
*H04L 5/00*    (2006.01)

(52) U.S. Cl.
CPC ........... *H04W 72/56* (2023.01); *H04L 5/0064* (2013.01)

(58) Field of Classification Search
CPC .............................. H04W 72/56; H04L 5/0064
See application file for complete search history.

(56) References Cited

U.S. PATENT DOCUMENTS

| | | | |
|---|---|---|---|
| 2017/0055265 A1 | 2/2017 | Wei | |
| 2020/0154397 A1* | 5/2020 | Kim | H04W 72/02 |
| 2021/0029688 A1* | 1/2021 | Zhang | H04L 5/0044 |
| 2021/0258922 A1* | 8/2021 | Xiao | H04W 72/02 |
| 2021/0352623 A1* | 11/2021 | Wang | H04W 72/0446 |
| 2021/0385710 A1* | 12/2021 | Jin | H04W 36/0072 |

FOREIGN PATENT DOCUMENTS

| | | |
|---|---|---|
| CN | 105307107 A | 2/2016 |
| CN | 107371193 A | 11/2017 |
| WO | 2017171519 A1 | 10/2017 |

OTHER PUBLICATIONS

Huawei, HiSilicon, Sidelink PHY structure and procedure for NR V2X, 3GPP TSG RAN WG1 Meeting #94bis, R1-1810138, Oct. 8-12, 2018, pp. 1-15, Chengdu, China.
(Continued)

*Primary Examiner* — Jackie Zuniga Abad
(74) *Attorney, Agent, or Firm* — Kunzler Bean & Adamson

(57) ABSTRACT

Apparatuses, methods, and systems are disclosed for resource pool assignment. One method (800) includes receiving (802) information indicating that multiple resource pools are assigned to a bandwidth part. Each resource pool of the multiple resource pools corresponds to a different numerology, a different maximum physical sidelink shared channel duration, or a combination thereof. The method (800) includes assigning (804) the multiple resource pools to the bandwidth part.

20 Claims, 11 Drawing Sheets

(56) References Cited

OTHER PUBLICATIONS

LG Electronics, Updated feature lead summary for agenda item 7.2.4.1.2 Physical layer structures and procedure(s), 3GPP TSG RAN WG1 Meeting #94bis, R1-1812017, Oct. 8-12, 2018, pp. 1-11, Chengdu, China.
ZTE, Initial consideration on NR V2X resource allocation, 3GPP TSG-RAN WG2 #103bis, R2-1814168, Oct. 8-12, 2018, pp. 1-7, Chengdu, China.
Nokia, Nokia Shanghai Bell, Discussion on NR V2X Sidelink Physical Layer Structures and Procedures, 3GPP TSG RAN WG1 Meeting #94bis, Oct. 8-12, 2018, pp. 1-14, Chengdu, China.
International Searching Authority, "Notification of Transmittal of the International Search Report and the Written Opinion of the International Searching Authority, or the Declaration", PCT/CN2018/113730, Nov. 2, 2018, pp. 1-6.
RAN4, "LS on BWP switching delay", 3GPP TSG RAN WG1 Meeting #92bis R1-1803602, Apr. 16-20, 2018, pp. 1-2.
Intel Corporation, "Draft LS on BWP switching delay", 3GPP TSG-RAN WG4 Meeting #86 R4-1803283, Feb. 26-Mar. 2, 2018, pp. 1-2.
3GPP, "3rd Generation Partnership Project; Technical Specification Group Services and System Aspects; Service requirements for V2X services; Stage 1 (Release 15)", 3GPP TS 22.185 V15.0.0, Jun. 2018, pp. 1-14.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.
3GPP, "3rd Generation Partnership Project; Technical Specification Group Radio Access Network; NR; Multiplexing and channel coding (Release 15)", 3GPP TS 38.212 V15.3.0, Sep. 2018, pp. 1-99.
3GPP, "3rd Generation Partnership Project; Technical Specification Group Radio Access Network; NR; Physical layer procedures for control (Release 15)", 3GPP TS 38.213 V15.3.0, Sep. 2018, pp. 1-101.
3GPP, "3rd Generation Partnership Project; Technical Specification Group Radio Access Network; NR; NR and NG-RAN Overall Description; Stage 2 (Release 15)", 3GPP TS 38.300 V15.3.0, Sep. 2018, pp. 1-92.
3GPP, "3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.
3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.

\* cited by examiner

700

| UL | SL | UL | UL | SL | SL | UL | UL | SL | UL | UL | SL | SL | UL |

FIG. 7

RESOURCE POOL ASSIGNMENT

FIELD

The subject matter disclosed herein relates generally to wireless communications and more particularly relates to resource pool assignment.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth Part ("BWP"), Component Carrier ("CC"), Coordinated Multipoint ("CoMP"), Categories of Requirements ("CoR"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Modulation Coding Scheme ("MCS"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Packet Switched ("PS"), Physical Sidelink Control Channel ("PSCCH"), Physical Sidelink Shared Channel ("PSSCH"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), Synchronization Signal ("SS"), SS/PBCH Block ("SSB"), Time Division Duplex ("TDD"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, resource pools may be used. In such networks, it may be time consuming to switch between different resource pools.

BRIEF SUMMARY

Methods for resource pool assignment are disclosed. Apparatuses and systems also perform the functions of the apparatus. In one embodiment, the method includes receiving first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof. In certain embodiments, the method includes assigning the first plurality of resource pools to the first bandwidth part.

An apparatus for resource pool assignment, in one embodiment, includes a receiver that receives first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof. In various embodiments, the apparatus includes a processor that assigns the first plurality of resource pools to the first bandwidth part.

A method for resource pool assignment includes receiving first information indicating a plurality of resource pools. In such an embodiment, each resource pool of the plurality of resource pools corresponds to a different numerology, a different maximum physical sidelink shared channel duration, or a combination thereof. In some embodiments, the method includes receiving second information indicating a mapping between a priority list and the plurality of resource pools.

An apparatus for resource pool assignment, in one embodiment, includes a receiver that: receives first information indicating a plurality of resource pools, wherein each resource pool of the plurality of resource pools corresponds to a different numerology, a different maximum physical sidelink shared channel duration, or a combination thereof; and receives second information indicating a mapping between a priority list and the plurality of resource pools.

In one embodiment, a method for resource pool assignment includes transmitting first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof.

An apparatus for resource pool assignment, in one embodiment, includes a transmitter that transmits first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof.

A method for resource pool assignment includes transmitting first information indicating a plurality of resource pools. In such an embodiment, each resource pool of the plurality of resource pools corresponds to a different numerology, a different maximum physical sidelink shared channel duration, or a combination thereof. In some embodiments, the method includes transmitting second information indicating a mapping between a priority list and the plurality of resource pools.

An apparatus for resource pool assignment, in one embodiment, includes a transmitter that: transmits first information indicating a plurality of resource pools, wherein each resource pool of the plurality of resource pools corresponds to a different numerology, a different maximum physical sidelink shared channel duration, or a combination thereof; and transmits second information indicating a mapping between a priority list and the plurality of resource pools.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a schematic flow chart diagram illustrating one embodiment of multiplexed communication opportunities;

DETAILED DESCRIPTION

Figure 1:
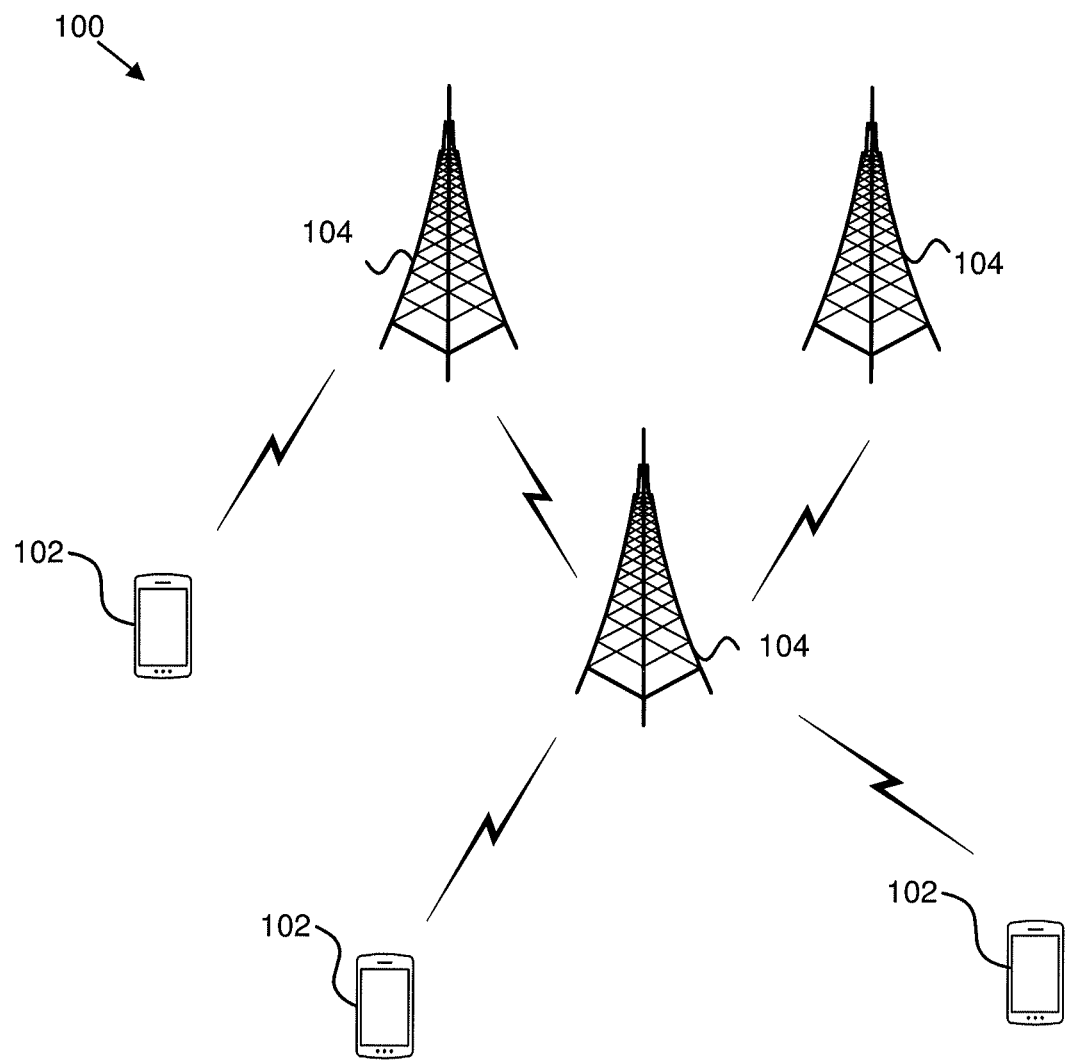
FIG. 1 is a schematic block diagram illustrating one embodiment of a wireless communication system for resource pool assignment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalitalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for resource pool assignment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive first information indicating that a first plurality of resource pools is assigned to a first bandwidth part. In such embodiments, each resource pool of the first plurality of resource pools corresponds to a different numerology, a different maximum physical sidelink shared channel duration, or a combination thereof. In certain embodiments, the remote unit 102 may assign the first plurality of resource pools to the first bandwidth part. Accordingly, a remote unit 102 may be used for resource pool assignment.

In certain embodiments, a remote unit 102 may receive first information indicating a plurality of resource pools. In such embodiments, each resource pool of the plurality of resource pools corresponds to a different numerology, a different maximum physical sidelink shared channel duration, or a combination thereof. In some embodiments, the remote unit 102 may receive second information indicating a mapping between a priority list and the plurality of resource pools. Accordingly, a remote unit 102 may be used for resource pool assignment.

In some embodiments, a network unit 104 may transmit first information indicating that a first plurality of resource pools is assigned to a first bandwidth part. In such embodiments, each resource pool of the first plurality of resource pools corresponds to a different numerology, a different maximum physical sidelink shared channel duration, or a combination thereof. Accordingly, a network unit 104 may be used for resource pool assignment.

In various embodiments, a network unit 104 may transmit first information indicating a plurality of resource pools. In such an embodiment, each resource pool of the plurality of resource pools corresponds to a different numerology, a different maximum physical sidelink shared channel duration, or a combination thereof. In some embodiments, the network unit 104 may transmit second information indicating a mapping between a priority list and the plurality of resource pools. Accordingly, a network unit 104 may be used for resource pool assignment.

Figure 2:
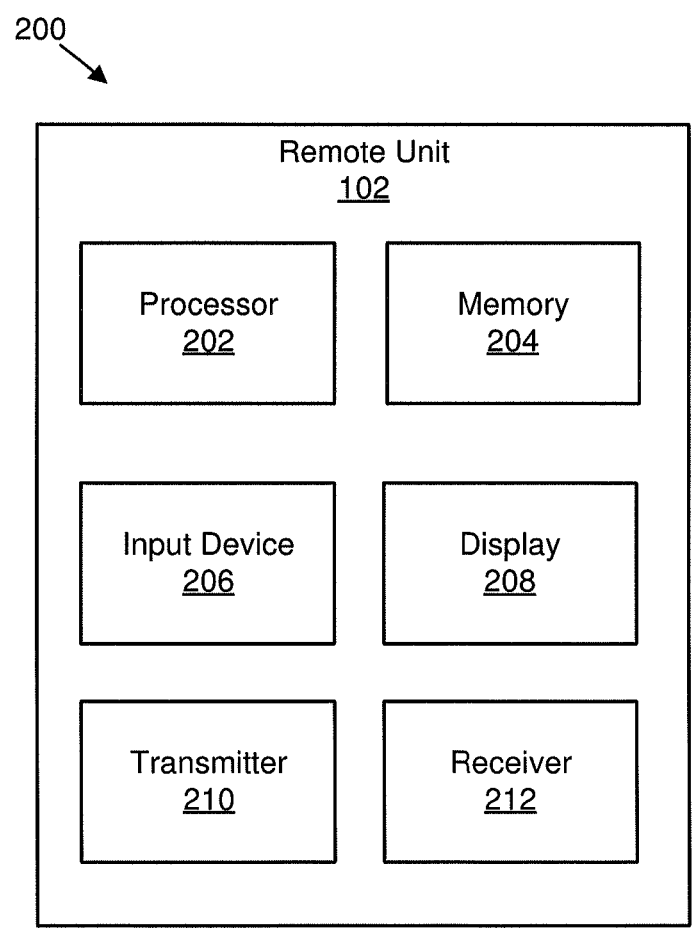
FIG. 2 is a schematic block diagram illustrating one embodiment of an apparatus that may be used for resource pool assignment.

FIG. 2 depicts one embodiment of an apparatus 200 that may be used for resource pool assignment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 assigns a first plurality of resource pools to a first bandwidth part. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 receives first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof.

In certain embodiments, the receiver 212: receives first information indicating a plurality of resource pools, wherein each resource pool of the plurality of resource pools corresponds to a different numerology, a different maximum physical sidelink shared channel duration, or a combination thereof; and receives second information indicating a mapping between a priority list and the plurality of resource pools.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
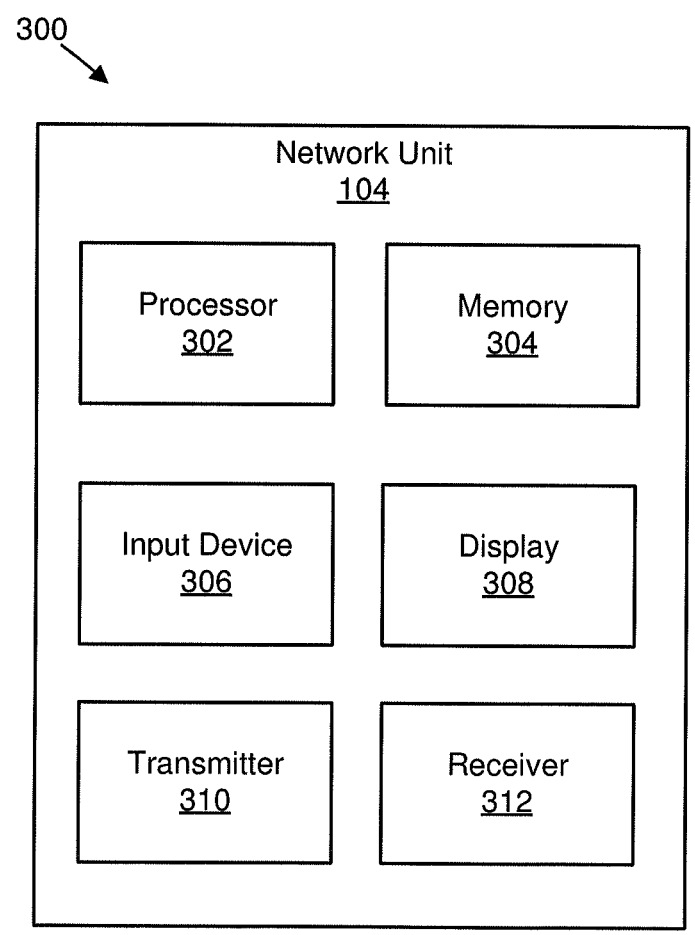
FIG. 3 is a schematic block diagram illustrating one embodiment of an apparatus that may be used for resource pool assignment.

FIG. 3 depicts one embodiment of an apparatus 300 that may be used for resource pool assignment. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 transmits first information indicating that a first plurality of resource pools is assigned to a first bandwidth part. In such embodiments, each resource pool of the first plurality of resource pools corresponds to a different numerology, a different maximum physical sidelink shared channel duration, or a combination thereof.

In some embodiments, the transmitter 310: transmits first information indicating a plurality of resource pools, wherein each resource pool of the plurality of resource pools corresponds to a different numerology, a different maximum physical sidelink shared channel duration, or a combination thereof; and transmits second information indicating a mapping between a priority list and the plurality of resource pools.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain networks, such as NR, V2X communication requirements may be varied depending on CoR as well as on different LoA. In some embodiments, five CoR may be used to support enhanced V2X scenarios: general aspects; vehicle platooning; advanced driving; extended sensors; and remote driving. In various embodiments, there may be six LoAs reflecting functional aspects of the technology and affecting system performance requirements. In such embodiments, the six LoAs may be: no automation; driver assistance; partial automation; conditional automation; high automation; and full automation. In certain embodiments, for each CoR and each LoA, requirements may be specified in terms of payload (e.g., from 50 to 12000 bytes), transmission rate (e.g., from 2 to 50 messages/sec), maximum end-to-end latency (e.g., from 3 to 500 ms), reliability (e.g., from 90% to 99.999%), data rate (e.g., from 0.5 to 1000 Mbps) and/or minimum required communication range (e.g., from 50 to 1000 meters). In some embodiments, each V2X application may belong to one of the CoRs and may cater to one of the LoAs. In such embodiments, a range of such application's requirement in terms of latency and reliability may be extensive. In various embodiments, a different numerology (e.g., SCS, cyclic prefix length, etc.) may be used to serve the different V2X applications. In some embodiments, scheduling based on a number of OFDM symbols may enable two applications to be served with the same numerology but with a different number of OFDM symbols (or mini slots) to achieve different latencies for the two applications. However, not all V2X applications may be best served within the same numerology. Because more than one V2X application may need to be active (e.g., send and/or receive V2X messages) at the same time, a UE may need to TX and/or RX V2X messages with different numerologies concurrently.

As described herein, mode 1 may be used as a scheduling mode in which the radio network sends a dynamic or semi persistent grant for a UE to transmit V2X messages, and mode 2 may be used as a scheduling mode in which the network does not send any dynamic or semi persistent grant but rather the UE itself (autonomously) chooses required resources from a resource pool broadcast by a radio network or from preconfigured resource pools if the UE is out of network coverage to transmit V2X messages.

In one embodiment, resources for V2X communication are allocated in a set of physical time frequency resources (e.g., physical resource blocks reserved for V2X communication on certain time instances) called resource pools (e.g., RPs). In certain embodiments, one RP is assigned one particular numerology by a network configuration (e.g., UEs using a certain RP may only transmit (or receive) V2X messages with this configured numerology). In such embodiments, the network may configure RPs dedicatedly to an RRC connected UE such that the RPs are contained as part of and within a configured UL BWP.

Figure 4:
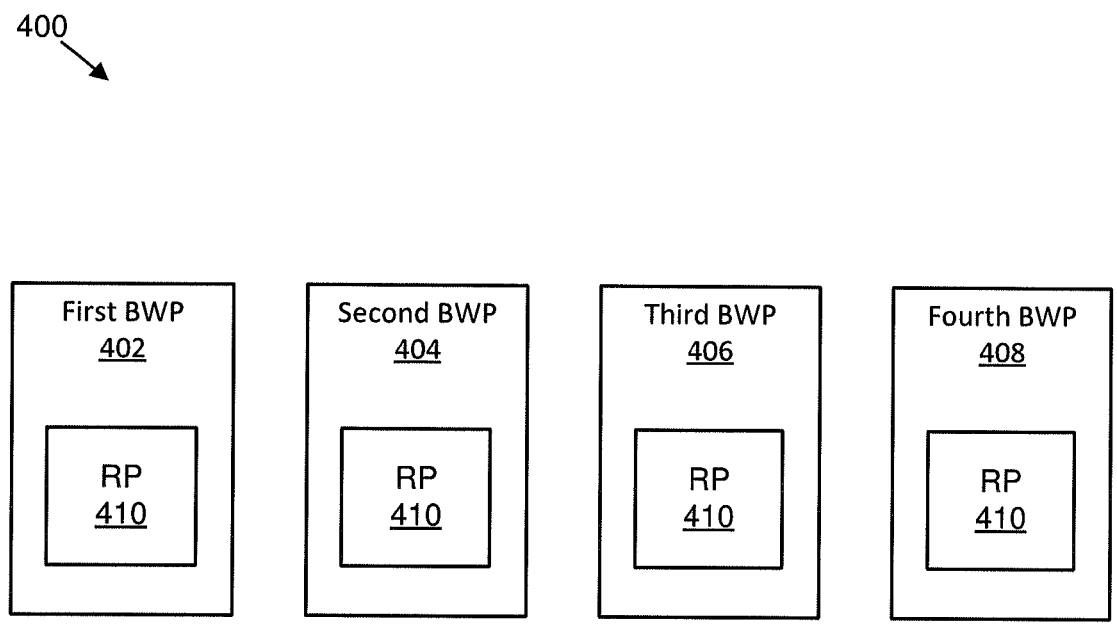
FIG. 4 is a schematic block diagram illustrating one embodiment of resource pool assignment.

FIG. 4 is a schematic block diagram illustrating one embodiment of resource pool assignment 400. The resource pool assignment 400 includes a first BWP 402, a second BWP 404, a third BWP 406, and a fourth BWP 408 all being assigned a RP 410. Accordingly, the RP 410 may be used by each of the first BWP 402, the second BWP 404, the third BWP 406, and the fourth BWP 408.

Accordingly, if the RP 410 is configured with a particular numerology (e.g., SCS, cyclic prefix length, etc.) that is suitable for a particular application, then the particular application can be served irrespective of the current active BWP (e.g., any of the first BWP 402, the second BWP 404, the third BWP 406, and the fourth BWP 408) of a UE (e.g., remote unit 102). In some embodiments, such as those illustrated in FIGS. 5 and 6, to serve different kinds of V2X applications the network may configure multiple RPs in each BWP.

In some embodiments, a radio network may configure a resource pool as follows:

with a packet on a particular V2X logical channel based on a mapping table that maps a priority associated to a V2X packet with a certain numerology and/or SCS. The mapping table may be configured by a network using RRC signaling provided to the UE, the mapping table may be provided by pre-configuration in the UE, or the mapping table may be provided by upper V2X layers to the UE access stratum; and 2) a PSSCH duration to be used with a packet on a particular V2X logical channel by considering latency (e.g., Max_latency) associated with a priority (of the packet), time taken in zero, one, or more re-transmissions (e.g., $T_{Re-Tx}$) of a packet if the re-transmissions are to be used based on any HARQ feedback, a time (e.g., $T_0$) after which resources from an allowable resource pool are to be first available (e.g., after application of any resource sensing procedure, if required) etc. The Max_latency may be determined based on a mapping table that maps priority associated to a V2X packet with a corresponding Max_latency. The mapping table may be configured by the network using RRC signaling provided to the UE, the mapping table may be provided by pre-configuration in the UE, or the mapping table may be provided by upper V2X layers to the UE access stratum. The re-transmission time ($T_{Re-Tx}$) may be preconfigured, be configurable by the network, and/or be a specified number of

```
ResourcePoolConfig ::=    SEQUENCE {
    Priority-List         SEQUENCE (SIZE (1..maxNrofResourcePools-1)) INTEGER (1..16),
    allowedSCS-List       SEQUENCE (SIZE (1..maxSCSs)) OF SubcarrierSpacing,
    maxPSSCH-Duration ENUMERATED { ms0p02, ms0p04, ms0p0625, ms0p125, ms0p25,
ms0p5, spare2, spare1 } OPTIONAL,
    configuredGrantType1Allowed ENUMERATED {true}
    ....
}
```

In such embodiments, a definition of individual parameters of the configured resource pool may be found in TS38.331-f30.

In certain embodiments, each resource pool may be configured with one or more of the following parameters: Priority-List: Each RP has a list of associated priorities that could be in the form of PPPP, PPPR, QOS or 5QI; allowedSCS-List: Each RP has a list of associated SCS (numerology); maxPSSCH-Duration: Each RP has a maximum PSSCH duration and a V2X UE making autonomous transmission on this resource pool may not select PSSCH duration longer than this value; and configuredGrantType1Allowed: Each RP indicates if sensing based resource selection reservation is allowed on this pool or not.

In various embodiments, each packet received from V2X upper layers may have an associated "priority" that can be one of the PPPP, PPPR, QOS or 5QI as defined in TS 36.331, TS 38.331, TS 36.300, TS 38.300 etc. In such embodiments, the priority may state a certain reliability and/or latency that the packet needs to be transmitted. In some embodiments, the reliability may be addressed by a numerology (e.g., SCS, CP length, etc.). In such embodiments, a higher numerology and/or SCS may mean a lower symbol time, lower CP length, and/or lower reliability. In certain embodiments, the latency may be addressed by numerology (e.g., SCS, CP length, etc.) and/or PSSCH-duration. In such embodiments, a higher numerology and/or SCS may mean a lower symbol time and/or a lower latency, and a lower PSSCH-duration may mean a lower latency.

In various embodiments, to select a resource pool, a UE may first determine: 1) a numerology and/or SCS to be used re-transmissions. In some embodiments, the PSSCH duration may be derived as: PSSCH duration=Max_latency−$T_0$−$T_{Re-Tx}$.

In some embodiments, a UE may select a resource pool that has a configured maxPSSCH-Duration that is larger than a PSSCH duration calculated as above and has a numerology as determined above in the allowedSCS-List. In certain embodiments, for actual transmission of a V2X message, a UE may choose an MCS based on the determined PSSCH duration, the SCS, and the V2X packet and/or message size.

As may be appreciated, any mechanism of resource pool selection described herein may be applicable irrespective of whether the resource pools are defined inside a BWP and/or irrespective of a BWP configuration (e.g., the resource pool's physical frequency resources may lie completely inside or completely outside of the BW of the BWP and may even be partially overlapping with the BWP). The reference to PSSCH duration may be equally applicable to a PSCCH channel or any other sidelink channel used for V2X communication.

In certain embodiments, if a current active BWP changes (e.g., via DCI based BWP switching, RRC based BWP switching, and/or timer based BWP switching as defined in TS 38.331, TS 38.321, TS 38.212, TS 38.213, for example), a UE may automatically start using (e.g., transmitting on) corresponding RPs in a new active UL BWP. A "corresponding" RP as used herein may mean a RP configured with the same set of application priority (e.g., PPPP, PPPR, QoS, or 5QI) and max PSSCH duration.

Figure 5:
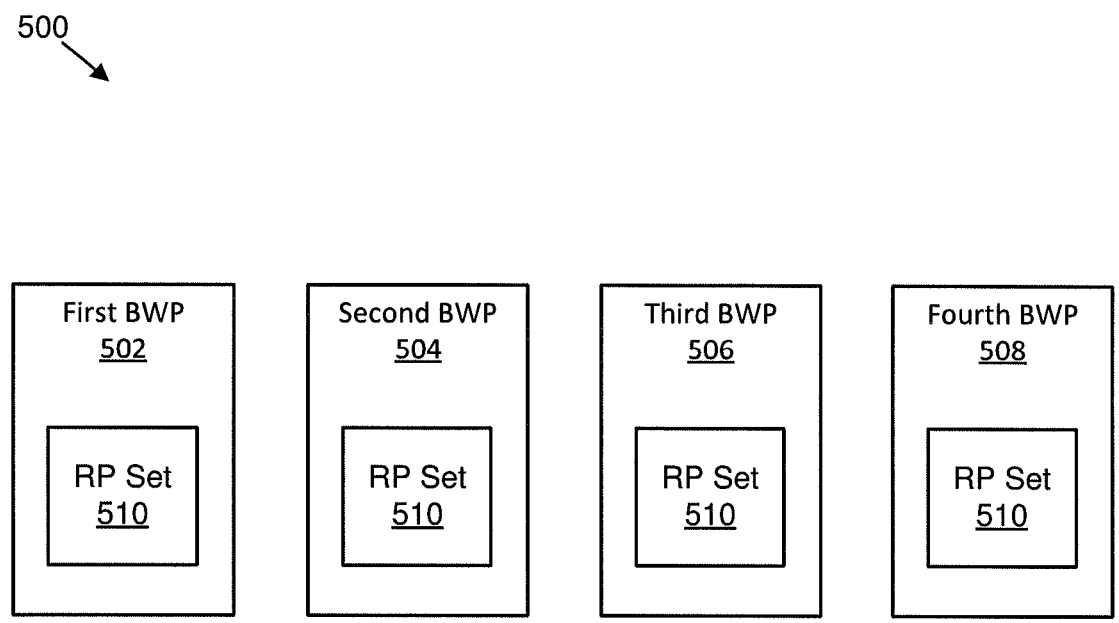
FIG. 5 is a schematic block diagram illustrating another embodiment of resource pool assignment.

FIG. 5 is a schematic block diagram illustrating another embodiment of resource pool assignment 500. The resource pool assignment 500 includes a first BWP 502, a second BWP 504, a third BWP 506, and a fourth BWP 508 all being assigned an RP set 510. Accordingly, the RP set 510 may be used by each of the first BWP 502, the second BWP 504, the third BWP 506, and the fourth BWP 508. The RP set 510 may include any number of RPs. For example, in one embodiment, the RP set 510 includes a first RP, a second RP, a third RP, up to an nth RP. As may be appreciated, the first RP (or any other specific RP) that is in each RP set 510 has the same set of application priority regardless of which BWP it is in. In the embodiment illustrated in FIG. 5, a UE may autonomously (e.g., without receiving signaling, by deciding on its own) transition between RPs in the RP set 510 based on the message to be transmitted by selecting an appropriate RP based on the numerology, SCS, and/or PSSCH duration corresponding to the message, as described above.

Because the numerology of RPs inside a BWP may be different (e.g., a first RP may be configured with a first numerology (e.g., a first SCS) that is suitable for a first application and a second RP may be configured with a second numerology (e.g., a second SCS) that is suitable for a second application), a V2X UE needing to transmit a second V2X message from the second application after having transmitted a first V2X message (or an UL transmission with a different numerology than the second SCS) from the first application may immediately start changing the SCS to the second SCS at any of the following occasion that becomes available at the earliest and thereby may minimize a switching time and ultimately a latency to serve the second application; the occasion starts: 1) as soon as the first V2X message is transmitted or even earlier (e.g., starting to tune the baseband processor while the RF frontend is transmitting the first V2X message); 2) if an UL subframe occurs before the next available SL (e.g., V2X) opportunity, as soon as the Uu UL (e.g., PSSCH and/o PUCCH) is transmitted or even earlier (e.g., starting to tune the baseband processor while the RF frontend is transmitting on Uu, if there is a UL transmission pending); 3) if an UL subframe occurs before the next available SL (e.g., V2X) opportunity, as soon as the start of the last Uu transmission opportunity just before the start of the SL (e.g., V2X) opportunity, if there is no UL transmission pending (or UL grant available).

As may be appreciated, an actual switching time to switch between different sub carrier spacings may be given by 3GPP TDoc R1-1803602(R4-1803283). Accordingly, by tuning to the target SCS earlier, delay time in switching numerology may be reduced.

Figure 6:
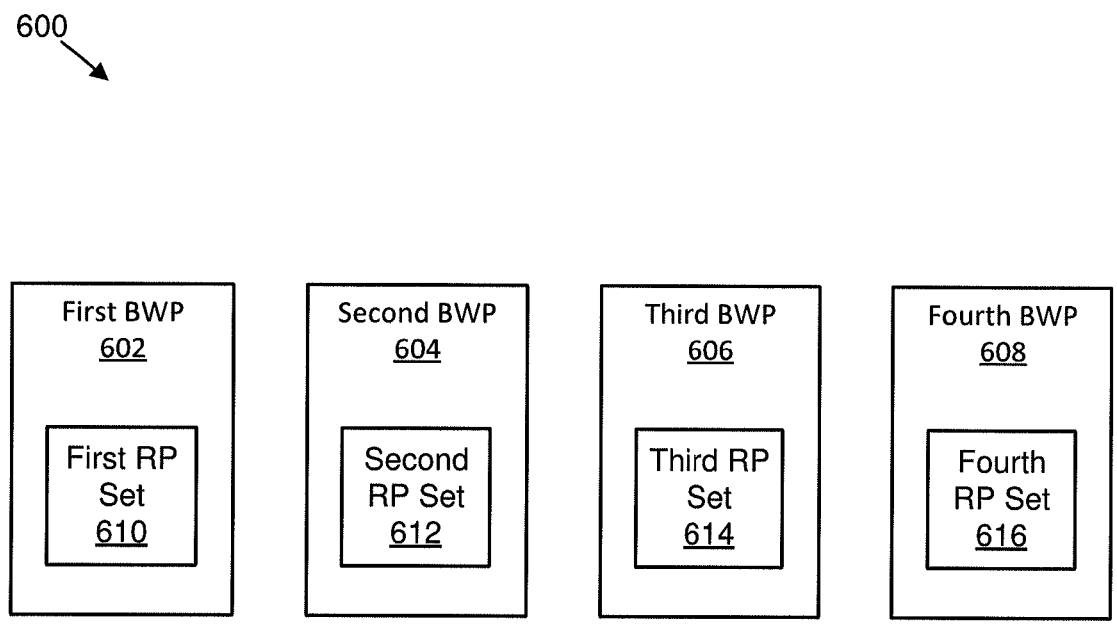
FIG. 6 is a schematic block diagram illustrating a further embodiment of resource pool assignment.

In certain embodiments, not all possible numerologies and/or applications may be configured by the network to be served on each configured BWP, as illustrated in FIG. 6. In such embodiments, a UE may autonomously switch to a BWP that provides a RP for transmission of data from an application that can't be served by any of the RPs in the current active BWP. In such embodiments, the switching may be done at a next available SL opportunity as shown in FIG. 7.

FIG. 6 is a schematic block diagram illustrating a further embodiment of resource pool assignment 600. The resource pool assignment 600 includes a first BWP 602, a second BWP 604, a third BWP 606, and a fourth BWP 608. The first BWP 602 is assigned a first RP set 610, the second BWP 604 is assigned a second RP set 612, the third BWP 606 is assigned a third RP set 614, and the fourth BWP 608 is assigned a fourth RP set 616. Each of the first RP set 610, the second RP set 612, the third RP set 614, and the fourth RP set 616 may include any number of RPs. For example, in one embodiment, the first RP set 610 includes a first RP, a fifth RP, a ninth RP, and so forth. In such an embodiment, the second RP set 612 includes a second RP, a sixth RP, a tenth RP, and so forth. Moreover, in such an embodiment, the third RP set 614 includes a third RP, a seventh RP, an eleventh RP, and so forth. Furthermore, in such an embodiment, the fourth RP set 616 includes a fourth RP, an eighth RP, a twelfth RP, and so forth. As may be appreciated, each of the RPs in a BWP may be different from the RPs in another BWP. In the embodiment illustrated in FIG. 6, a UE may autonomously (e.g., without receiving signaling, by deciding on its own) transition between RPs based on the message to be transmitted by selecting an appropriate RP based on the numerology, SCS, and/or PSSCH duration corresponding to the message, as described above. Based on the selected RP, the UE may need to change BWPs.

Figure 7:
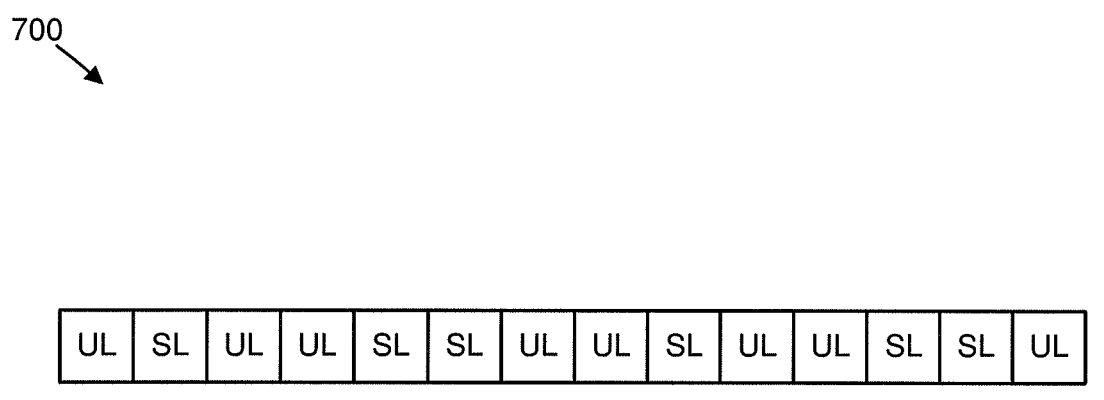

FIG. 7 is a schematic flow chart diagram illustrating one embodiment of multiplexed communication opportunities 700. The multiplexed communication opportunities 700 may include any ordering of UL and SL subframes. Only one possible embodiment is illustrated.

In various embodiments, from a UE's perspective, a network may configure separate SL BWP for reception of V2X communication. In such embodiments, the UE may switch to a SL BWP for reception of V2X communication in SL subframes. In some embodiments, the SL and UL subframes are time occasions for which an opportunity for transmission as well as for reception of a corresponding link is configured by the network as shown in FIG. 7. These opportunities may be TDD multiplexed and may be represented using a bitmap. In some embodiments, the network (e.g., network unit 104) may provide the bitmap to a UE (e.g., remote unit 102) to indicate to the UE the multiplexed communication opportunities 700.

In certain embodiments, inside a SL BWP for reception of V2X, a UE may change the SCS to receive V2X messages from different applications of interest. In one embodiment, the network may indicate (e.g., using an indicator) a sequence of the numerologies that are to be used for transmission and/or reception. This indication may be made implicitly by a resource pool's time resource multiplexing pattern and/or by explicitly signaling to the UEs the sequence in which the numerologies are to be used. As described herein, SCS may be changed with reduced delay.

In various embodiments, such as for RRC idle UEs to perform V2X communications, all the resources for V2X communication may be defined for a UE (e.g., resource pools for transmission as well as reception inside an initial BWP).

In some embodiments, a network may configure transmission and reception resource pools for V2X communication without associating them with any corresponding UL BWP. In such embodiments, the transmission and reception resource pools for V2X communication may be broadcast and/or may be signaled to RRC connected UEs. In certain embodiments, the RPs may be confined fully or partially outside a BW of any of configured BWP or initial BWP. In various embodiments, for mode 1 based V2X communication, a network may provide resources for SL communication. In some embodiments, for mode-2 based communication a UE may determine a priority between UL and V2X communication if the dynamic or configured UL grant and the SL grant selected to fulfil an application latency for V2X communication are expected to collide. Such a collision may refer to partial or full overlap of the transmission opportunity with a switching time or delay in changing a BW, center frequency, and/or SCS of different transmissions. In certain embodiments, prioritization may be done by a combination of QoS (e.g., 5QI or LCH priority of the bearers in question), link quality (e.g., of Uu interface vs PC5 interface), and so forth. If a collision is between two (or more) V2X applications, then a UE may determine the priority between the two (or more) V2X applications and/or messages. The prioritization may be done by a combination of QoS (e.g., 5QI or LCH priority of the bearers in question), link quality (e.g., of PC5 links going to different destination), resource usage of the different PC5 links, and so forth. In one embodiment, the network may indicate (e.g., using an indicator) a sequence of the numerologies that are to be used for transmission and/or reception. This indication may be made implicitly by a resource pool's time resource multiplexing pattern and/or by explicitly signaling to the UEs the sequence in which the numerologies are to be used. As described herein, SCS may be changed with reduced delay.

In NR UL and DL BWPs may be configured to a UE to enable UL and DL data transmission and reception respectively. A BWP may be a UE specific configuration and, therefore, if a V2X transmission is made in resources of an activated BWP (if defined), then from a receiving UE's perspective the UE needs to be able to receive V2X communication on any portion of the wideband carrier with any numerology that may have been configured to any transmitting UE. This may be a problem for V2X reception since not all such UEs may support reception on wideband carrier with multiple numerologies simultaneously. Some of this can be solved by the network configuration limiting transmission resource pools inside the BWP only in certain time-frequency regions and further allocating different time opportunities to multiplex different numerology. A receiving UE then need not open an RF front to capture the whole wideband carrier and may only need to change numerology for reception from time to time to receive the V2X communication of interest to it. Alternatively, a dedicated BWP for SL operation containing multiple RPs may be configured. The UE may autonomously switch to this dedicated BWP on subframes assigned for V2X SL operation.

A number of resource pools may be configured in a BWP, each catering to a different set of numerology and/or application. From the transmitter perspective, a resource pool selection may be performed keeping in mind the priority associated to each packet. The priority indicated by the upper layers may be mappable to latency and reliability requirements. A resource pool may be configured not only with the list of numerologies that should be used for transmission in the resources of this resource pool but with a maximum PSSCH duration as well. A change of BWP may result in a UE switching to RPs on a new activated BWP. Also, if not all possible numerology resource pools are configured in each BWP, a UE may switch the BWP to serve an important V2X application that cannot be served in the current activated BWP.

Alternatively, resource pools may be configured without requiring and associating them to BWPs. A transmitting side behavior may remain the same in resource pool selection and the Uu and SL operations may independently go on. A delay in switching a BWP and/or SCS may remain the same irrespective of the approach taken.

Figure 8:
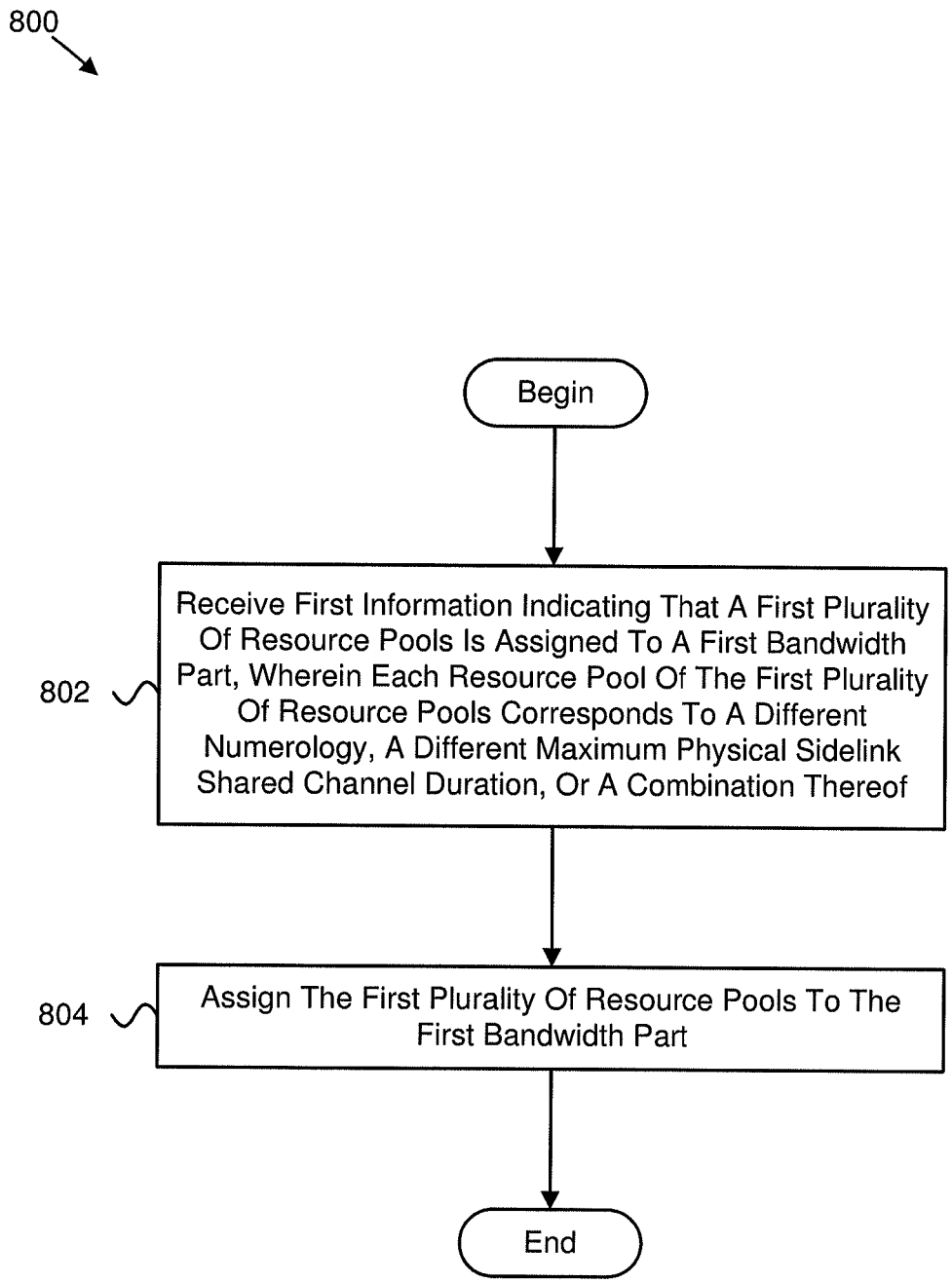
FIG. 8 is a schematic flow chart diagram illustrating one embodiment of a method for resource pool assignment.

FIG. 8 is a schematic flow chart diagram illustrating one embodiment of a method 800 for resource pool assignment. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof. In certain embodiments, the method 800 includes assigning 804 the first plurality of resource pools to the first bandwidth part.

In certain embodiments, the method 800 comprises assigning the first plurality of resource pools to a second bandwidth part. In some embodiments, the method 800 comprises: receiving second information indicating that a second plurality of resource pools is assigned to a second bandwidth part, wherein each resource pool of the second plurality of resource pools corresponds to a different numerology, a different maximum physical sidelink shared channel duration, or a combination thereof; and assigning the second plurality of resource pools to the second bandwidth part.

In various embodiments, the first plurality of resource pools is different from the second plurality of resource pools. In one embodiment, the method 800 comprises selecting a resource pool of the first plurality of resource pools based on an indicator corresponding to a message to be transmitted. In certain embodiments, the method 800 comprises transmitting the message using the resource pool.

In some embodiments, a numerology corresponding to each resource pool of the first plurality of resource pools comprises a sub-carrier spacing, a cyclic prefix length, or a combination thereof. In various embodiments, the method 800 comprises autonomously changing from a first resource pool corresponding to the first bandwidth part to a second resource pool corresponding to a second bandwidth part in response to a change from the first bandwidth part to the second bandwidth part. In one embodiment, the method 800 comprises autonomously changing from the first bandwidth part to a second bandwidth part in response to the first bandwidth part no longer being usable by an application.

In certain embodiments, the method 800 comprises switching a device from using a first resource pool of the first plurality of resource pools for transmitting a first message to using a second resource pool of the first plurality of resource pools for transmitting a second message. In some embodiments, the device switches from using the first resource pool to using the second resource pool after the first message is transmitted via the first resource pool. In various embodiments, the device switches from using the first resource pool to using the second resource pool while the first message is being transmitted via the first resource pool.

Figure 9:
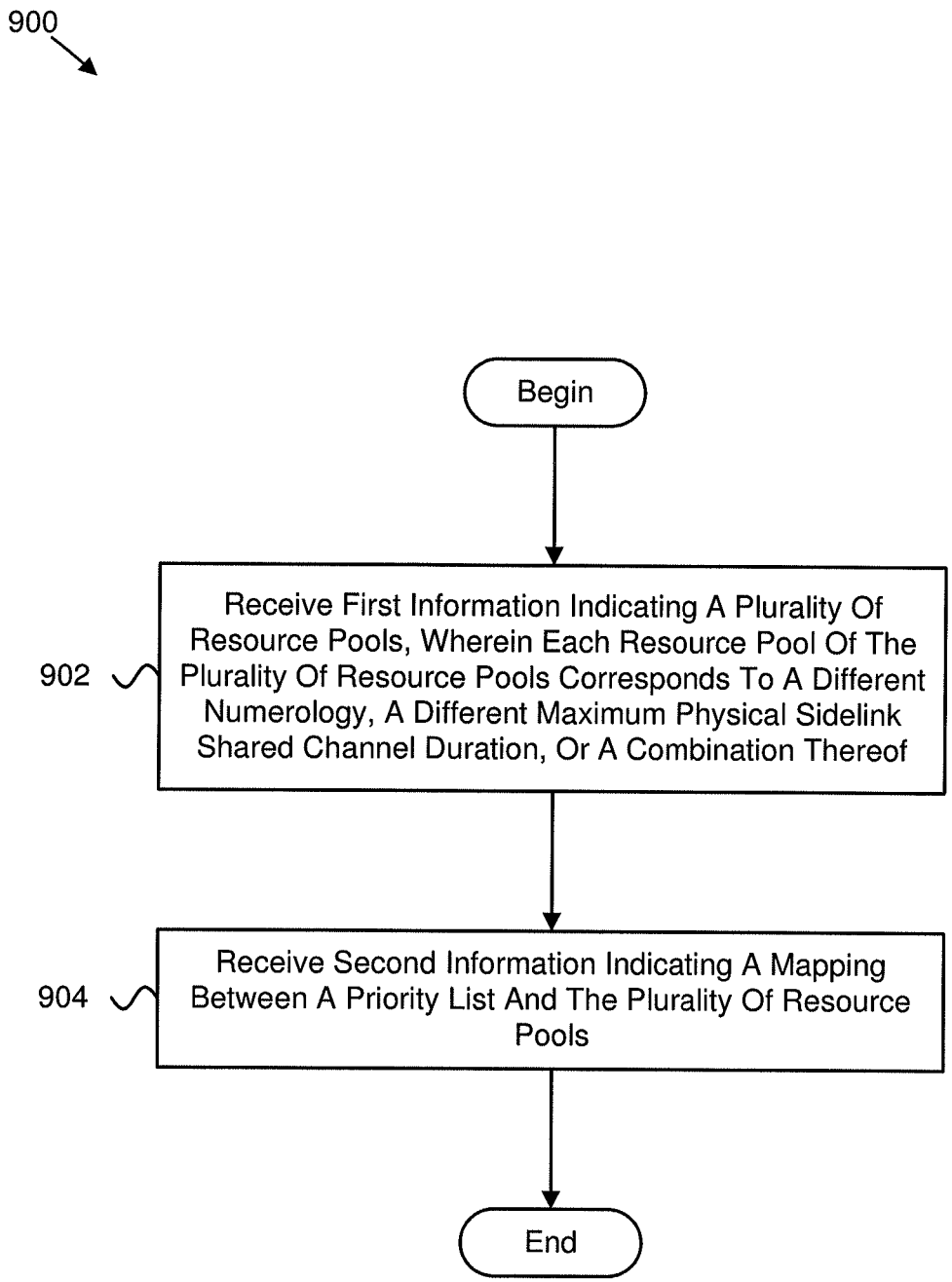
FIG. 9 is a schematic flow chart diagram illustrating another embodiment of a method for resource pool assignment.

FIG. 9 is a schematic flow chart diagram illustrating another embodiment of a method 900 for resource pool assignment. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 first information indicating a plurality of resource pools. In such an embodiment, each resource pool of the plurality of resource pools corresponds to a different numerology, a different maximum physical sidelink shared channel duration, or a combination thereof. In some embodiments, the method 900 includes receiving 904 second information indicating a mapping between a priority list and the plurality of resource pools.

In certain embodiments, the method 900 comprises selecting a resource pool of the plurality of resource pools based on an indicator corresponding to a message to be transmitted and a priority of the message to be transmitted. In some embodiments, the method 900 comprises transmitting the message using the resource pool.

Figure 10:
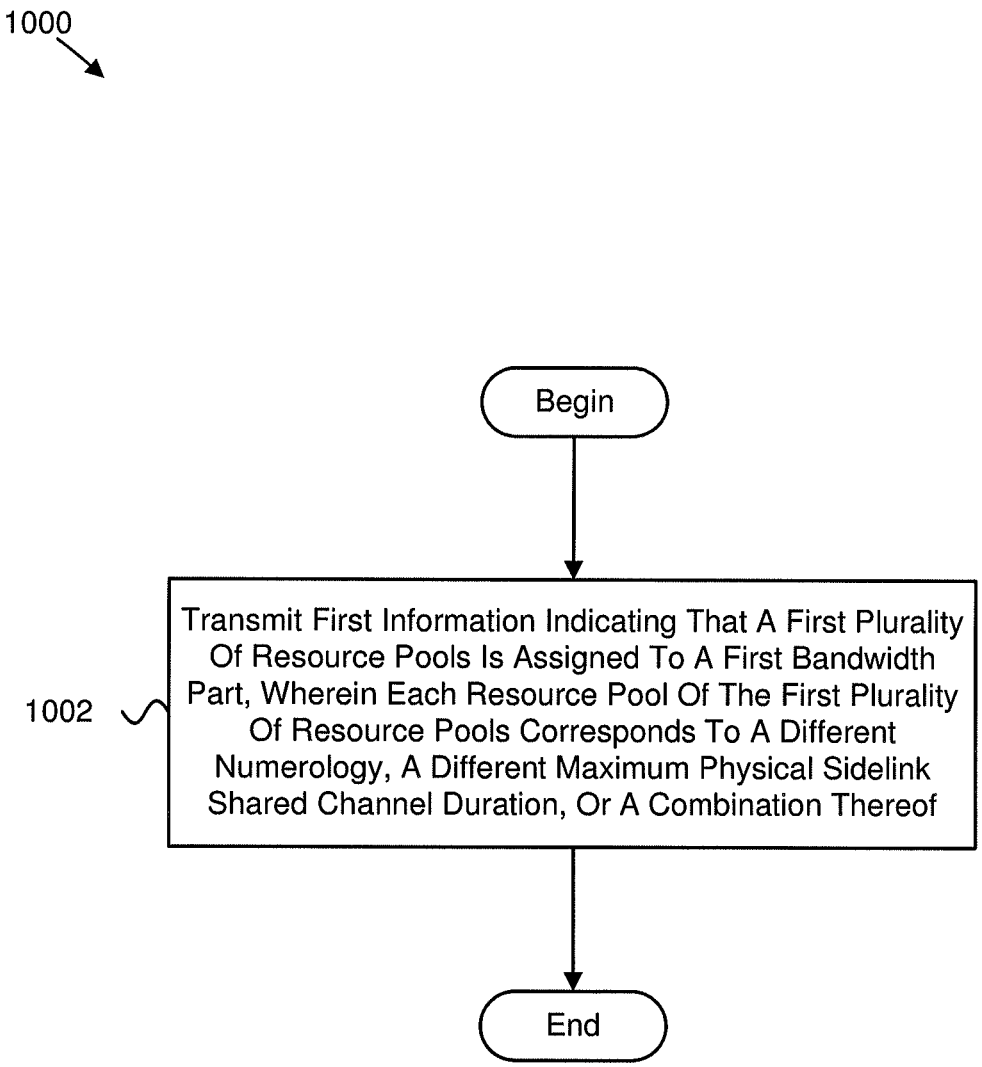
FIG. 10 is a schematic flow chart diagram illustrating a further embodiment of a method for resource pool assignment.

FIG. 10 is a schematic flow chart diagram illustrating a further embodiment of a method 1000 for resource pool assignment. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 first information indicating that a first plurality of resource pools is assigned to a first bandwidth part. In such an embodiment, each resource pool of the first plurality of resource pools corresponds to a different numerology, a different maximum physical sidelink shared channel duration, or a combination thereof.

In certain embodiments, the first plurality of resource pools is assigned to a second bandwidth part. In some embodiments, the method 1000 comprises transmitting second information indicating that a second plurality of resource pools is assigned to a second bandwidth part, wherein each resource pool of the second plurality of resource pools corresponds to a different numerology, a different maximum physical sidelink shared channel duration, or a combination thereof.

In various embodiments, the first plurality of resource pools is different from the second plurality of resource pools. In one embodiment, a numerology corresponding to each resource pool of the first plurality of resource pools comprises a sub-carrier spacing, a cyclic prefix length, or a combination thereof.

Figure 11:
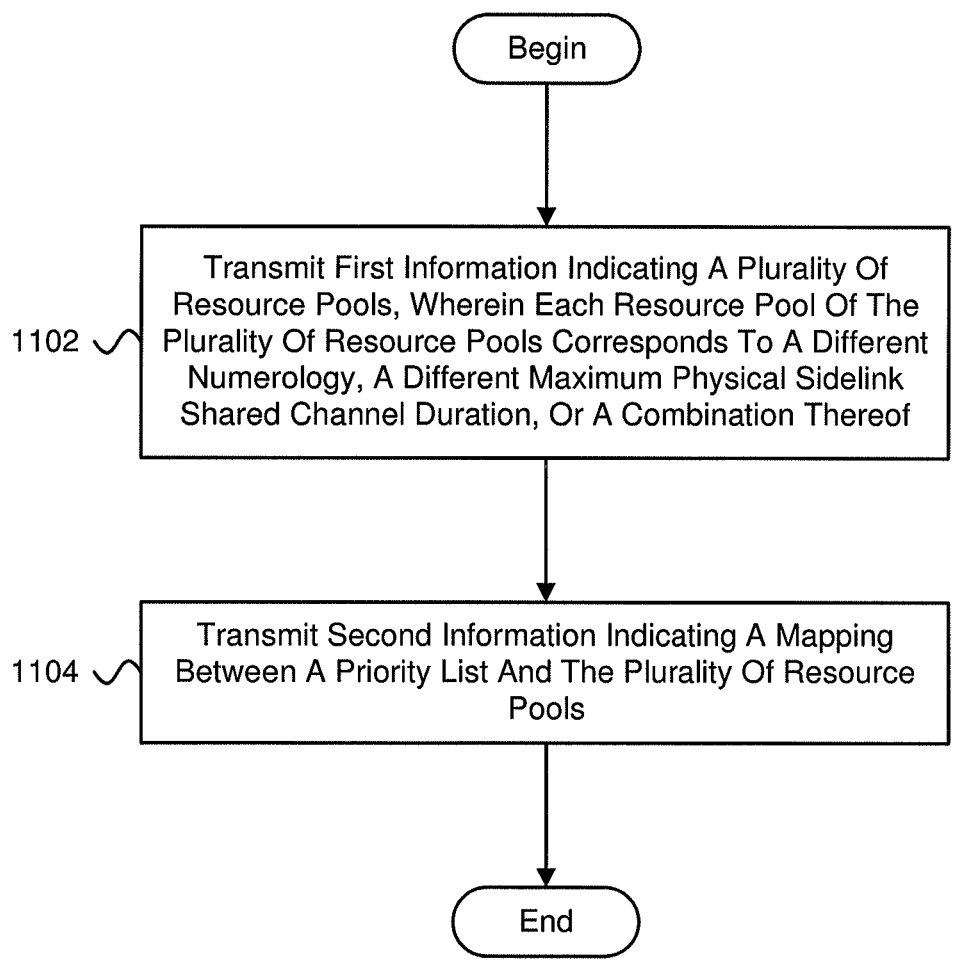
FIG. 11 is a schematic flow chart diagram illustrating yet another embodiment of a method for resource pool assignment.

FIG. 11 is a schematic flow chart diagram illustrating yet another embodiment of a method 1100 for resource pool assignment. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include transmitting 1102 first information indicating a plurality of resource pools. In such an embodiment, each resource pool of the plurality of resource pools corresponds to a different numerology, a different maximum physical sidelink shared channel duration, or a combination thereof. In some embodiments, the method 1100 includes transmitting 1104 second information indicating a mapping between a priority list and the plurality of resource pools.

In one embodiment, a method comprises: receiving first information indicating that a first plurality of resource pools is assigned to a first bandwidth part, wherein each resource pool of the first plurality of resource pools corresponds to a different numerology, a different maximum physical sidelink shared channel duration, or a combination thereof; and assigning the first plurality of resource pools to the first bandwidth part.

In certain embodiments, the method comprises assigning the first plurality of resource pools to a second bandwidth part.

In some embodiments, the method comprises: receiving second information indicating that a second plurality of resource pools is assigned to a second bandwidth part, wherein each resource pool of the second plurality of resource pools corresponds to a different numerology, a different maximum physical sidelink shared channel duration, or a combination thereof; and assigning the second plurality of resource pools to the second bandwidth part.

In various embodiments, the first plurality of resource pools is different from the second plurality of resource pools.

In one embodiment, the method comprises selecting a resource pool of the first plurality of resource pools based on an indicator corresponding to a message to be transmitted.

In certain embodiments, the method comprises transmitting the message using the resource pool.

In some embodiments, a numerology corresponding to each resource pool of the first plurality of resource pools comprises a sub-carrier spacing, a cyclic prefix length, or a combination thereof.

In various embodiments, the method comprises autonomously changing from a first resource pool corresponding to the first bandwidth part to a second resource pool corresponding to a second bandwidth part in response to a change from the first bandwidth part to the second bandwidth part.

In one embodiment, the method comprises autonomously changing from the first bandwidth part to a second bandwidth part in response to the first bandwidth part no longer being usable by an application.

In certain embodiments, the method comprises switching a device from using a first resource pool of the first plurality of resource pools for transmitting a first message to using a second resource pool of the first plurality of resource pools for transmitting a second message.

In some embodiments, the device switches from using the first resource pool to using the second resource pool after the first message is transmitted via the first resource pool.

In various embodiments, the device switches from using the first resource pool to using the second resource pool while the first message is being transmitted via the first resource pool.

In one embodiment, an apparatus comprises: a receiver that receives first information indicating that a first plurality of resource pools is assigned to a first bandwidth part, wherein each resource pool of the first plurality of resource pools corresponds to a different numerology, a different maximum physical sidelink shared channel duration, or a combination thereof; and a processor that assigns the first plurality of resource pools to the first bandwidth part.

In certain embodiments, the processor assigns the first plurality of resource pools to a second bandwidth part.

In some embodiments: the receiver receives second information indicating that a second plurality of resource pools is assigned to a second bandwidth part, wherein each resource pool of the second plurality of resource pools corresponds to a different numerology, a different maximum physical sidelink shared channel duration, or a combination thereof; and the processor assigns the second plurality of resource pools to the second bandwidth part.

In various embodiments, the first plurality of resource pools is different from the second plurality of resource pools.

In one embodiment, the processor selects a resource pool of the first plurality of resource pools based on an indicator corresponding to a message to be transmitted.

In certain embodiments, the apparatus comprises a transmitter that transmits the message using the resource pool.

In some embodiments, a numerology corresponding to each resource pool of the first plurality of resource pools comprises a sub-carrier spacing, a cyclic prefix length, or a combination thereof.

In various embodiments, the processor autonomously changes from a first resource pool corresponding to the first bandwidth part to a second resource pool corresponding to a second bandwidth part in response to a change from the first bandwidth part to the second bandwidth part.

In one embodiment, the processor autonomously changes from the first bandwidth part to a second bandwidth part in response to the first bandwidth part no longer being usable by an application.

In certain embodiments, the processor switches the apparatus from using a first resource pool of the first plurality of resource pools for transmitting a first message to using a second resource pool of the first plurality of resource pools for transmitting a second message.

In some embodiments, the apparatus switches from using the first resource pool to using the second resource pool after the first message is transmitted via the first resource pool.

In various embodiments, the apparatus switches from using the first resource pool to using the second resource pool while the first message is being transmitted via the first resource pool.

In one embodiment, a method comprises: receiving first information indicating a plurality of resource pools, wherein each resource pool of the plurality of resource pools corresponds to a different numerology, a different maximum physical sidelink shared channel duration, or a combination thereof; and receiving second information indicating a mapping between a priority list and the plurality of resource pools.

In certain embodiments, the method comprises selecting a resource pool of the plurality of resource pools based on an indicator corresponding to a message to be transmitted and a priority of the message to be transmitted.

In some embodiments, the method comprises transmitting the message using the resource pool.

In one embodiment, an apparatus comprises: a receiver that: receives first information indicating a plurality of resource pools, wherein each resource pool of the plurality of resource pools corresponds to a different numerology, a different maximum physical sidelink shared channel duration, or a combination thereof; and receives second information indicating a mapping between a priority list and the plurality of resource pools.

In certain embodiments, the apparatus comprises a processor that selects a resource pool of the plurality of resource pools based on an indicator corresponding to a message to be transmitted and a priority of the message to be transmitted.

In some embodiments, the apparatus comprises a transmitter that transmits the message using the resource pool.

In one embodiment, a method comprises: transmitting first information indicating that a first plurality of resource pools is assigned to a first bandwidth part, wherein each resource pool of the first plurality of resource pools corresponds to a different numerology, a different maximum physical sidelink shared channel duration, or a combination thereof.

In certain embodiments, the first plurality of resource pools is assigned to a second bandwidth part.

In some embodiments, the method comprises transmitting second information indicating that a second plurality of resource pools is assigned to a second bandwidth part, wherein each resource pool of the second plurality of resource pools corresponds to a different numerology, a different maximum physical sidelink shared channel duration, or a combination thereof.

In various embodiments, the first plurality of resource pools is different from the second plurality of resource pools.

In one embodiment, a numerology corresponding to each resource pool of the first plurality of resource pools comprises a sub-carrier spacing, a cyclic prefix length, or a combination thereof.

In one embodiment, an apparatus comprises: a transmitter that transmits first information indicating that a first plurality of resource pools is assigned to a first bandwidth part, wherein each resource pool of the first plurality of resource pools corresponds to a different numerology, a different maximum physical sidelink shared channel duration, or a combination thereof.

In certain embodiments, the first plurality of resource pools is assigned to a second bandwidth part.

In some embodiments, the transmitter transmits second information indicating that a second plurality of resource pools is assigned to a second bandwidth part, wherein each resource pool of the second plurality of resource pools corresponds to a different numerology, a different maximum physical sidelink shared channel duration, or a combination thereof.

In various embodiments, the first plurality of resource pools is different from the second plurality of resource pools.

In one embodiment, a numerology corresponding to each resource pool of the first plurality of resource pools comprises a sub-carrier spacing, a cyclic prefix length, or a combination thereof.

In one embodiment, a method comprises: transmitting first information indicating a plurality of resource pools, wherein each resource pool of the plurality of resource pools corresponds to a different numerology, a different maximum physical sidelink shared channel duration, or a combination thereof; and transmitting second information indicating a mapping between a priority list and the plurality of resource pools.

In one embodiment, an apparatus comprises: a transmitter that: transmits first information indicating a plurality of resource pools, wherein each resource pool of the plurality of resource pools corresponds to a different numerology, a different maximum physical sidelink shared channel duration, or a combination thereof; and transmits second information indicating a mapping between a priority list and the plurality of resource pools.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by at a user equipment (UE), the method comprising:
   receiving first information indicating that a first plurality of resource pools is assigned to a first bandwidth part (BWP), wherein the first BWP is a frequency portion of a carrier bandwidth frequency range, and wherein each resource pool of the first plurality of resource pools corresponds to a different priority, a different subcarrier spacing (SCS), and a different maximum physical sidelink shared channel duration;
   receiving third information indicating that a first resource pool of the first plurality of resource pools is assigned to a first application and that a second resource pool of the first plurality of resource pools is assigned to a second application; and
assigning the first plurality of resource pools to the first BWP.

2. The method of claim 1, further comprising assigning the first plurality of resource pools to a second BWP.

3. The method of claim 1, further comprising:
receiving second information indicating that a second plurality of resource pools is assigned to a second BWP, wherein each resource pool of the second plurality of resource pools corresponds to a different numerology, a different maximum physical sidelink shared channel duration, or a combination thereof; and
assigning the second plurality of resource pools to the second BWP.

4. The method of claim 3, wherein the first plurality of resource pools is different from the second plurality of resource pools.

5. The method of claim 1, further comprising selecting a resource pool of the first plurality of resource pools based on an indicator corresponding to a message to be transmitted.

6. The method of claim 5, further comprising transmitting the message using the resource pool.

7. The method of claim 1, wherein a numerology corresponding to each resource pool of the first plurality of resource pools comprises a sub-carrier spacing, a cyclic prefix length.

8. The method of claim 1, further comprising autonomously changing from a first resource pool corresponding to the first BWP to a second resource pool corresponding to a second BWP in response to a change from the first BWP to the second BWP.

9. The method of claim 1, further comprising autonomously changing from the first BWP to a second BWP in response to the first BWP no longer being usable by an application.

10. The method of claim 1, further comprising switching a device from using the first resource pool for transmitting a first message to using the second resource pool for transmitting a second message.

11. The method of claim 10, wherein the device switches from using the first resource pool to using the second resource pool after the first message is transmitted via the first resource pool.

12. The method of claim 10, wherein the device switches from using the first resource pool to using the second resource pool while the first message is being transmitted via the first resource pool.

13. A user equipment (UE), comprising:
at least one memory; and
at least one processor coupled with the at least one memory and configured to cause the UE to:
receive first information indicating that a first plurality of resource pools is assigned to a first bandwidth part (BWP), wherein the first BWP is a frequency portion of a carrier bandwidth frequency range, and wherein each resource pool of the first plurality of resource pools corresponds to a different priority, a different subcarrier spacing (SCS), and a different maximum physical sidelink shared channel duration;
receive third information indicating that a first resource pool of the first plurality of resource pools is assigned to a first application and that a second resource pool of the first plurality of resource pools is assigned to a second application; and
assign the first plurality of resource pools to the first BWP.

14. The UE of claim 13, wherein the at least one processor is configured to cause the UE to assign the first plurality of resource pools to a second BWP.

15. The UE of claim 13, wherein the at least one processor is configured to cause the UE to:
receive second information indicating that a second plurality of resource pools is assigned to a second BWP, wherein each resource pool of the second plurality of resource pools corresponds to a different numerology, a different maximum physical sidelink shared channel duration, or a combination thereof; and
assign the second plurality of resource pools to the second BWP.

16. A method performed by a base station, the method comprising:
transmitting first information indicating that a first plurality of resource pools is assigned to a first bandwidth part (BWP), wherein the first BWP is a frequency portion of a carrier bandwidth frequency range, and wherein each resource pool of the first plurality of resource pools corresponds to a different priority, a different subcarrier spacing (SCS), and a different maximum physical sidelink shared channel duration; and
transmitting third information indicating that a first resource pool of the first plurality of resource pools is assigned to a first application and that a second resource pool of the first plurality of resource pools is assigned to a second application.

17. The method of claim 16, wherein the first plurality of resource pools is assigned to a second BWP.

18. The method of claim 16, further comprising transmitting second information indicating that a second plurality of resource pools is assigned to a second BWP, wherein each resource pool of the second plurality of resource pools corresponds to a different numerology, a different maximum physical sidelink shared channel duration, or a combination thereof.

19. The method of claim 18, wherein the first plurality of resource pools is different from the second plurality of resource pools.

20. A base station, comprising:
at least one memory; and
at least one processor coupled with the at least one memory and configured to cause the base station to:
transmit first information indicating that a first plurality of resource pools is assigned to a first bandwidth part (BWP), wherein the first BWP is a frequency portion of a carrier bandwidth frequency range, and wherein each resource pool of the first plurality of resource pools corresponds to a different priority, a different subcarrier spacing (SCS), and a different maximum physical sidelink shared channel duration; and
transmit third information indicating that a first resource pool of the first plurality of resource pools is assigned to a first application and that a second resource pool of the first plurality of resource pools is assigned to a second application.

\* \* \* \* \*